United States Patent Office 3,825,618
Patented July 23, 1974

3,825,618
CURABLE ORGANOPOLYSILOXANES
Anthony Enrico Pepe, Sylvania, Ohio, assignor to
Stauffer Chemical Company
No Drawing. Continuation of abandoned application Ser.
No. 780,290, Nov. 29, 1968. This application Dec. 10,
1970, Ser. No. 97,021
Int. Cl. C08g 47/00
U.S. Cl. 260—827         19 Claims

ABSTRACT OF THE DISCLOSURE

A curable organopolysiloxane composition comprising a hydroxyl-terminated organopolysiloxane, an organometallic catalyst, and a curing agent consisting of polyfunctional silanes or siloxanes having a terminal group selected from the class consisting of an oxirane, cyano radical, and a carboxyl radical and, if desired, polyalkoxysilanes or polyalkoxysiloxanes. These organopolysiloxane compositions will result in a cured silicone rubber having improved elongation, tear strength, and reduced durometer.

---

This is a continuation of Application Ser. No. 780,290, filed Nov. 29, 1968, and now abandoned.

The present invention relates to curable organopolysiloxanes, particularly to curable organopolysiloxanes having improved physical properties and more particularly to curable organopolysiloxane compositions which utilize novel curing systems.

Although silicone rubbers were found to be desirable for many industrial applications, they were found to be undesirable in some applications where high elongation, high tear strength, and low durometer values were required.

In order to improve upon these properties, several curing systems were investigated in an attempt to produce desirable room-temperature-curable organopolysiloxane elastomers with improved elongation, tear strength, and durometer values. One of the first systems for preparing silicone elastomers involved the addition of an alkyl silicate to polymeric siloxanes containing acid groups to provide a silicone elastomer having improved properties. While this system produced desirable elastomers, corrosive materials were formed as by-products which rendered the system undesirable. This system was subsequently improved upon by the use of hydrocarbonoxy silicates and metal carboxylic acid catalysts to form bubble-free elastomers free of corrosive substances. However, this resulted in a system having a considerably increased curing time. In an effort to reduce the curing time and to improve upon the physical properties, a system which utilized a hydroxylated diorganopolysiloxane containing a small amount of an organo-hydrogen-siloxane was investigated. Although the curing time was acceptable, voids were formed in the thick sections of the elastomeric material by the evolution of hydrogen. Thus a system for preparing a silicone rubber having improved elongation, tear strength, and durometer values is desirable and essential for many industrial applications.

Therefore, it is an object of this invention to provide a curable organopolysiloxane composition. Another object of this invention is to provide a curable organopolysiloxane composition having improved properties. Still another object of this invention is to provide a novel curing system. A further object of this invention is to provide a novel curing system which will produce silicone rubbers free of voids.

The foregoing objects and others which will become apparent from the following description are accomplished in accordance with this invention, generally speaking, by providing a curable organopolysiloxane composition which comprises combining a hydroxyl-terminated organopolysiloxane with a curing agent or a mixture of curing agents in the presence of an organometallic catalyst.

More specifically, the invention relates to a room-temperature - curable organopolysiloxane composition which comprises mixing together an organopolysiloxane having a viscosity of at least about 100 centipoises at 25° C. and containing silicon bonded hydroxyl groups with a curing agent of the general formula:

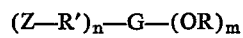

wherein G represents a silicon atom or a siloxane group:

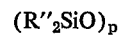

in which R is an organic group or halo-substituted organic group having from 1 to 10 carbon atoms; R' represents a divalent group having from 2 to 10 carbon atoms; R" is an organic group having from 1 to 10 carbon atoms; Z is a functional group having vicinal carbon atoms to which an oxirane oxygen is attached, a cyano radical, or a acyloxy radical; $m$ is a number of from 2 to 3; $n$ is a number of from 1 to 3 and the remaining valences of the silicon atom may be satisfied by radicals represented by R"; and $p$ is a number of from 2 to 10.

Specific examples of R groups which are operative in this invention are alkyl radicals, such as methyl, ethyl, propyl, butyl, hexyl, octyl, and decyl; aryl radicals, such as phenyl, xenyl, and naphthyl; aralkyl radicals, such as benzyl; alkaryl radicals, such as tolyl and xylyl; halogenated hydrocarbon radicals, such as chloromethyl, bromophenyl, tetrafluoroethyl, fluoroethyl, trifluorotolyl, hexafluoroxylyl, heptachloroxenyl, and the like. Divalent groups represented by R' above are alkylene radicals, such as ethylene, tetramethylene hexamethylene, octamehtylene, and decamethylene; arylene radicals, such as phenylene and groups of carbon atoms connected by ether linkages —C—O—C—. The organic groups represented by R" above are monovalent hydrocarbon radicals, halogenated monovalent hydrocarbon radicals, and cyanoalkyl radicals.

The oxirane represented by Z above may be further illustrated by the formula:

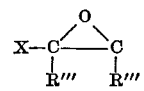

in which R'" represents hydrogen or hydrocarbon radicals; X represents hydrogen or a monovalent radical consisting of a single carbon atom or a group of carbon atoms interconnected by single or multiple bonds which have additional groups, such as hydrogen, alkyl, hydroxyl, alkoxy, amino, cyclic-hydrocarbon groups, or combinations thereof, attached thereto. Examples of suitable carbon-containing groups are aliphatic, cycloaliphatic, aromatic, heterocyclic groups, and combinations thereof. In addition, X may also contain one or more oxirane oxygen atoms attached to vicinal carbon atoms. When the R'"(s) are taken together with the vicinal carbon atoms, they can represent a cyclic group, such as a cyclohexane ring or a cyclopentane ring substituted or unsubstituted with other groups, e.g., alkyl, aryl substituents, and the like. Thus, the epoxy-containing silicone compounds may be selected from the class consisting of monoepoxides and polyepoxides, particularly monoepoxides, diepoxides, and triepoxides, or mixtures thereof.

In addition to representing a cyano radical (—CN), Z also represents an acyloxy radical (—OOCR"") in which R"" is a saturated or unsaturated hydrocarbon or halogenated hydrocarbon radical. Examples of suitable carboxy radicals are monoacyl radicals of carboxylic acids, such as acetoxy, propionyloxy, valeryloxy, caproyloxy, myristoyloxy, stearoyloxy, acryloxy, methacryloxy, and the like.

Examples of suitable silanes and siloxanes are:

γ-glycidoxypropyltriethoxysilane,
4,5-epoxypentatriethoxysilane,
γ-glycidoxypropyltributoxysilane,
ω-glycidoxybutyltriethoxysilane,
γ-glycidoxypropyltripropoxysilane,
γ-glycidoxypropyltrimethoxysilane,
ω-glycidoxyhexyltriethoxysilane,
ω-glycidoxyoctyltriethoxysilane,
ω-glycidoxyhexyltributoxysilane,
glycidoxy-o,p-phenyltriethoxysilane,
5,6-epoxyhexyltrimethoxysilane,
5,6-epoxyhexyltributoxysilane,
7,8-epoxyoctyltrimethoxysilane,
7,8-epoxyoctyltripropoxysilane,
9,10-epoxydecyltrimethoxysilane,
9,10-epoxydecyltripropoxysilane,
β-3,4-(epoxycyclohexyl)ethyltrimethoxysilane,
β-3,4-(epoxycyclohexyl)propyltributoxysilane,
β-cyanoethyltriethoxysilane,
β-cyanoethyltributoxysilane,
γ-cyanopropyltriethoxysilane,
ω-cyanohexyltriethoxysilane,
γ-methacryloxypropyltrimethoxysilane,
ω-methacryloxybutyltrimethoxysilane, and the like.

The hydroxyl-terminated organopolysiloxanes may be represented by the formula:

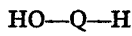

wherein Q represents a siloxane of the formula:

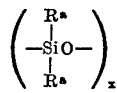

or a modified siloxane of the formula:

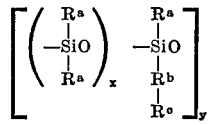

wherein $R^a$, which may be the same or different, represents monovalent hydrocarbon radicals, halogenated monovalent hydrocarbon radicals, or cyanoalkyl radicals; $R^b$ is a divalent hydrocarbon radical; $R^c$ is a polymeric organic radical linked to $R^b$ by a carbon-to-carbon linkage; $x$ is a number of from 1 to 20,000 and $y$ is a number of from 1 to 500.

In the above formula, $R^a$ is an organic group selected from the class consisting of alkyl radicals having from 1 to 8 carbon atoms, such as methyl, ethyl, butyl, hexyl, octyl; aryl radicals, such as phenyl, diphenyl, and the like; alkaryl radicals, such as tolyl, xylyl, ethylphenyl, and the like; aralkyl radicals, such as benzyl, phenethyl, and the like; haloaryl radicals, such as chlorophenyl, tetrachlorophenyl, difluorophenyl, and the like. $R^b$ is a divalent hydrocarbon radical having from 1 to 6 carbon atoms, such as ethylene, trimethylene, tetramethylene, hexamethylene, and the like. $R^c$ is a polymer or copolymer linked to the organopolysiloxane through a carbon-to-carbon linkage with a divalent hydrocarbon radical represented by $R^b$ above.

The hydroxyl-terminated organopolysiloxane fluids are further characterized by viscosities at 25° C. of from about 100 cs. up to about 2,000,000 cs. and preferably in the range of from about 1,000 to 50,000 cs. For the most part, such organopolysiloxanes will vary from pourable liquids to viscous fluids which will slowly flow when poured. Such organopolysiloxanes are further characterized by an organic group to silicon atom ratio of from about 1.9:1 to 2:1 and contain one hydroxyl group bonded to each of the terminal silicon atoms of the polymer chains.

The hydroxyl-terminated modified organopolysiloxanes are prepared by abstracting hydrogen from a silicone polymer in the presence of a free-radical initiator to form an active site for grafting an organic polymer thereto.

The term "modified organopolysiloxane" is meant to include compositions containing an organopolysiloxane (silicone) polymer and an organic polymer in which part or all of the organic polymer is connected to the silicone polymer by a carbon-to-carbon linkage.

Any silicone polymer may be used in this invention since these polymers are apparently capable of producing some free radicals or active sites under the proper conditions. Thus, the silicone polymer should be one which is capable of producing a substantial or recognizable number of free radicals and it should be substantially free of any tendency to undergo further polymerization under the conditions employed. Preferably, the silicone polymer has lower alkyl radicals attached to the silicon atoms since these are more amenable to hydrogen abstraction than other radicals.

Examples of suitable silicone polymers and copolymers which may be used in the formation of the modified organopolysiloxanes are hydroxyl-terminated siloxane fluids such as dimethyl fluids, methylphenyl fluids, copolymers of dimethylsiloxane and phenylmethyl- or diphenylsiloxane units.

Any polymerizable organic monomer having aliphatic olefinic bonds may be grafted to the silicone polymer. Examples of suitable olefinic compounds are low molecular weight straight-chained hydrocarbons, such as ethylene, propylene, butylene; vinyl halides, such as vinyl chloride, vinyl fluoride; vinyl esters of organic acids, such as vinyl acetate, styrene, ring-substituted styrenes; and other vinyl aromatics, such as vinyl pyridine and vinyl naphthylene; acrylic acid and derivatives of acrylic acid including the salts, esters, amides, and acrylonitrile; n-vinyl compounds, such as n-vinyl carbazole, n-vinyl pyrrolidine, and n-vinyl caprolactam; and vinyl silicon compounds, such as vinyltriethoxysilane. Other monomers which may be used are disubstituted ethylene, including vinylidene fluoride, vinylidene chloride, vinylidene cyanide; methacrylic acid and compounds derived therefrom, such as the salts, esters, and amides, as well as methacrolein, methacrylonitrile, and the like. The monomers may be used singly or in combinations of two or three or even more.

The grafting is most expeditiously effected by using a free-radical initiator, normally organic peroxides, although other free-radical initiators, such as azo-compounds in which both the N atoms and the remaining valences of the tertiary carbon atom of the azo linkage are attached to a tertiary carbon atom are satisfied by nitrile, carboxyl, alkyl, cycloalkylene, or alkyl radicals having from 1 to 18 carbon atoms, may be used. In addition to the above mentioned initiators, ionizing radiation may also be used to bring about the formation of free radicals.

Suitable examples of peroxides which are operative in this invention are hydroperoxides, such as t-butyl hydroperoxide, cumene hydroperoxide, decylene hydroperoxide; dialkyl peroxides, such as di-t-butyl and dicumyl hydroperoxide; cyclic peroxides, such as ascaridole and 1,5-dimethylhexane-1,5-peroxide and peresters, such as t-butyl perbenzoate, t-butyl peroxyisopropyl carbonate and t-butyl peroctoate; ketone peroxides, such as acetone peroxide, and cyclohexanone peroxide.

The amount of free-radical initiator employed is not critical thus, any amount capable of producing a perceptible degree of grafting is suitable. Generally, as little as 0.05 percent of the more active peroxide initiators based on the weight of the monomers is adequate in most cases. However, where it is desirable to increase the reaction rate, then as much as 3 percent or even more of the initiator may be used.

If desired, the unreacted monomers may be separated from the grafted product by any conventional technique known in the art, such as by distillation, solvent extraction, or selective solvent fractionation.

The curable organopolysiloxanes are prepared by mixing hydroxyl-terminated organopolysiloxanes with polyfunctional silanes or polyfunctional siloxanes or mixtures thereof in the presence of an organometallic catalyst. Examples of suitable catalysts are metal salts and more preferably metallic salts of carboxylic acids which include carboxylic acid salts of lead, tin, zirconium, iron, cadmium, titanium, calcium, and manganese. It is preferred that the carboxylic acid salts of the above metals be characterized by properties that the carboxylic acid radical contain less than 14 carbon atoms and preferably from 3 to 14 carbon atoms. Also, it is preferred that the salt be soluble in the organopolysiloxanes, although insoluble salts may be employed if they are properly dispersed in the system. Examples of metal salts of carboxylic acids which are operative are the naphthenates, propenates, butyrates, hexanates, oleates, benzoates, laurates, linoleates, stearates, and octoates, of the above metals. Other organometallic compounds which are suitable as catalysts are dibutyltin butoxychloride, bis(acetoxybutylphenyltin) oxide, bis(acetoxydibutyltin) oxide, bis(dimethyloctyltin) oxide, bis(tribenzyltin) oxide, bis(tributyltin) oxide, benzylbutylphenyltin hydroxide, di-t-butylchlorotin hydroxide, and the like. These catalysts may be dispersed in an inert solvent and then added to the organopolysiloxane composition or they may be dispersed on a filler and thereafter milled with the organopolysiloxane. Examples of suitable hydrocarbon solvents are benzene, toluene, xylene, and the like; halogenated hydrocarbon solvents, such as perchloroethylene or chlorobenzene; organic ethers, such as diethyl ether, dibutyl ether, and the like or fluid hydroxyl-free polysiloxanes. It is preferred that the solvents be of sufficient volatility to vaporize off at a very low temperature.

The catalysts used in these curing systems are effective in minimal amounts, e.g., from about 0.05 to about 2 percent, preferably from about 0.1 to about 1 percent, by weight based on the weight of the composition. A mixture of two or more of the catalysts may be used, if desired.

In still another embodiment, polyalkoxysilanes of the formula:

$$(RO)_c—G—(W)_{4-c}$$

or polyalkoxysiloxanes in which the silicon atoms are linked through Si—O—Si linkages and the remaining valences are satisfied by W or OR, may be used in combination with the curing agents described heretofore to form a silicone rubber having desirable properties. In the above formula, G and R are the same as those represented above, W is an organic group, and $c$ is a number of from 2 to 4. In addition, W may be the same as R or an alkoxy or aryloxy group corresponding to the general formula OR where R is, for instance, selected from the same group as R above, as well as various halogenated derivatives of these alkyl, aryl, aralkyl, and alkaryl radicals attached to the silicon atoms through the medium of an oxygen atom. Thus, the halogens, for example, chlorine, bromine, etc., may be attached to any position in the alkyl group or in the aryl group and may comprise any number of halogens.

Examples of suitable organosilicates are ethyltrimethoxysilane, methylbutoxydiethoxysilane, propyltripropoxysilane, methyltriethoxysilane, ethyltriethoxysilane, ethyl orthosilicate, and n-butyl orthosilicate. Examples of alkylpolysilicates are ethylpolysilicate, isopropylpolysilicate, butylpolysilicate, dimethyltetraethoxydisiloxane, trimethylpentabutoxytrisiloxane, and partially hydrolyzed silicates, such as ethyl silicate "40."

Other compounds which may be used in combination with the heretofore described polyfunctional silanes or siloxanes in the curing system are phenyltriethoxysilane, phenyltributoxysilane, diphenyldiethoxysilane, propyltrimethoxysilane, hexyltrimethoxysilane, octyltrimethoxysilane, propyltributoxysilane, methyltriethoxysilane, and the like.

The amount of polyalkoxysilane or polyalkoxysiloxane which may be used in combination with the polyfunctional silanes or siloxanes may range from about 20 to 80 percent, preferably from about 20 to 60 percent and more preferably from about 30 to 50 percent by weight based on the weight of the polyfunctional silanes or siloxanes. If the amount exceeds about 80 percent, the cure rate is not substantially increased. On the other hand, if the amount of polyalkoxysilane or polyalkoxysiloxane is below about 20 percent, properties, such as elongation, tear strength, and durometer, are substantially reduced.

Curing of the organopolysiloxane compositions of this invention takes place spontaneously at room temperature upon mixing the hydroxyl-terminated organopolysiloxane, the curing agent, and the organometallic catalyst. The curing, in general, will require from about 0.25 to about 24 hours at room temperature. If desired, the curing rate can be substantially increased by changing the ratio of the respective curing agents, i.e., polyfunctional silanes or siloxanes to polyalkoxysilanes or siloxanes.

Various fillers may be incorporated in the organopolysiloxane compositions in order to impart desirable physical properties. Examples of such fillers are titanium dioxide, lithopone, zinc oxide, zirconium silicate, silica aerogel, iron oxide, diatomaceous earth, calcium carbonate, fumed silica, precipitated silica, glass fibers, etc. The amount of filler used may obviously be varied within wide limits, for example, from about 10 to about 300 percent by weight of the filler based on the weight of the organopolysiloxane containing hydroxyl - terminated silicon bonded groups. The exact amount of filler used will depend upon such factors as, for example, the application to which the organopolysiloxane is intended and the type of filler employed.

In order to prepare the compositions herein described, it is only necessary to mix the ingredients, preferably adding the organometallic catalyst and the curing agent last since shortly after incorporation of these ingredients in the hydroxyl-terminated organopolysiloxane, setting up of the composition will begin to occur in a matter of minutes, and a cure will begin to be observed within one to two hours. The products thus derived show an improved elongation, improved tensile strength, and reduced durometer over the conventional organopolysiloxane compositions known in the art.

The compositions herein described have many applications. One of the applications for which they can and have been used is in connection with dental impressions. They may also be used as sealers for joints between adjacent sections of highways, as insulation material for electrical components, gasket materials, shock absorbers, and for other applications for which known natural synthetic rubbers are unsuitable.

The embodiments of this invention are further illustrated by the following examples in which all parts are by weight unless otherwise specified.

EXAMPLE 1

(a) About 100 parts of a hydroxyl-terminated polydimethylsiloxane fluid (2000 cps.) is mixed with about 5 parts of ethyl silicate "40," about 65 parts of Minusil (5 microns), and 10 parts of zinc oxide for about 30 minutes. About 0.3 parts of dibutyltin butoxychloride is added to the composition and mixed for an additional 2 minutes, after which time it is poured into a mold and allowed to cure at room temperature. After curing for 24 hours and again after 7 days, the physical properties of the cured composition are determined.

(b) In accordance with the procedure described above, about 5 parts of γ-glycidoxypropyltrimethoxysilane is substituted for ethyl silicate "40."

(c) In accordance with the procedure described in Example 1(a) above, about 5 parts of β-cyanoethyltriethoxysilane is substituted for ethyl silicate "40."

(d) The procedure described in Example 1(a) above is repeated except that β - 3,4-(epoxycyclohexyl)ethyltriethoxysilane is substituted for ethyl silicate "40."

(e) The procedure described in Example 1(a) above is repeated except that 5 parts of γ-methacryloxypropyltrimethoxysilane is substituted for ethyl silicate "40."

The physical properties of the cured organopolysiloxane compositions prepared in the above examples are determined after 24 hours and again after 7 days. The results of these tests are illustrated in Table I.

TABLE I

| Ex. No. | Physical properties | | | | | | | |
|---|---|---|---|---|---|---|---|---|
| | Tensile strength, p.s.i. after— | | Elongation, percent after— | | Tear strength, p.p.i. after— | | Hardness, Shore A after— | |
| | 24 hours | 7 days | 24 hours | 7 days | 24 hours | 7 days | 24 hours | 7 days |
| 1(a) | 400 | 650 | 165 | 145 | -------- | 20 | 48 | 55 |
| 1(b) | 547 | 617 | 190 | 227 | -------- | 68 | 42 | 42 |
| 1(c) | 648 | 657 | 223 | 217 | -------- | 41 | 44 | 44 |
| 1(d) | 537 | 602 | 204 | 220 | -------- | 56 | 48 | 48 |
| 1(e) | 384 | 396 | 230 | 239 | -------- | 54 | 47 | 47 |

TABLE II

| Example number | Curing agents | Catalysts | | | |
|---|---|---|---|---|---|
| | | DBTD | DMTO | DBT | SO |
| | | Curing time, hr. | | | |
| 2(a) | GTMS | 1.3 | 0.5 | 1.0 | 0.02 |
| 2(b) | β-3,4 | 8.0 | 2.1 | 2.9 | 0.05 |
| 2(c) | β-CES | 1.1 | 0.6 | 0.6 | 0.02 |
| 2(d) | γ-MPS | 1.1 | 0.6 | 0.6 | 0.03 |

NOTE.—DBTD=Dibutyltin butoxychloride; DMTO=Bis(dimethyltin laurato) oxide; DBT=Dibutyltin dilaurate; SO=Stannous octoate. GTMS=γ-Glycidoxypropyltrimethoxysilane; β-3,4=β-3,4-(epoxycyclohexyl)ethyltrimethoxysilane; β-CES=β-Cyanoethyltriethoxysilane, γ-MPS=γ-Methacryloxypropyltrimethoxysilane.

EXAMPLE 3

Several curable organopolysiloxane compositions are prepared by adding about 65 parts of Minusil (5 microns), 10 parts of zinc oxide, 5 parts of a curing agent and 0.5 parts of dibutyltin butoxychloride to 100 parts of polydimethylsiloxane (2000 cps.). Each composition is poured into a mold and cured at room temperature. The physical properties of the cured products are determined after 48 hours and again after 7 days. The physical properties of the cured products are illustrated in Table III.

TABLE III

| Curing agents, parts | | | | Physical properties after— | | | | | | |
|---|---|---|---|---|---|---|---|---|---|---|
| | | | | 48 hours | | | 7 days | | | |
| GTMS | ΦTES | ES(P) | ES-40 | Ten., p.s.i. | Elong., percent | Hard. | Ten., p.s.i. | Elong., percent | Tear, p.p.i. | Hard. |
| 2.5 | | | 2.5 | 785 | 154 | 45 | 714 | 141 | -------- | 45 |
| 4.5 | | | 0.5 | 618 | 191 | 39 | 604 | 207 | -------- | 37 |
| 0.5 | | | 4.5 | 854 | 132 | 50 | 769 | 113 | -------- | 51 |
| DΦDES | | | | | | | | | | |
| 2.5 | | | 2.5 | 517 | 237 | 25 | 573 | 302 | -------- | 27 |
| 4.5 | | | 0.5 | 651 | 209 | 27 | 616 | 248 | -------- | 32 |
| ΦTES | | | | | | | | | | |
| 2.5 | | | 2.5 | 581 | 210 | 38 | 635 | 246 | -------- | 37 |
| 4.5 | | | 0.5 | 640 | 200 | 43 | 650 | 226 | -------- | 37 |
| 0.5 | | | 4.5 | 745 | 200 | 34 | 425 | 140 | -------- | 40 |
| PTMS | | | | | | | | | | |
| 2.5 | | | 2.5 | 658 | 264 | 32 | 639 | 330 | 50 | 31 |
| 4.5 | | | 0.5 | 721 | 241 | 32 | 693 | 272 | 49 | 32 |
| β-3,4 | | | | | | | | | | |
| 2.5 | | | 2.5 | 679 | 267 | 36 | 638 | 224 | 44 | 36 |
| 4.5 | | | 0.5 | 744 | 216 | 36 | 735 | 265 | 48 | 34 |
| 0.5 | | | 4.5 | 640 | 212 | 36 | 565 | 217 | 53 | 38 |
| DΦDES | | | | | | | | | | |
| 2.5 | 0.2 | 0.8 | 1.5 | 712 | 209 | 35 | 765 | 271 | 35 | 33 |
| 0.5 | 0.36 | 1.44 | 2.7 | 689 | 214 | 35 | 737 | 286 | 44 | 32 |

NOTE.—GTMS=γ-Glycidoxypropyltrimethoxysilane; ES-40=Ethyl silicate "40"; DΦDES=Diphenyldiethoxysilane; ΦTES=Phenyltriethoxysilane; PTMS=Propyltrimethoxysilane; ES (P)=Ethyl silicate (pure); β-3,4-=β-3,4-(epoxycyclohexyl)ethyltrimethoxysilane; Ten.=Tensile strength; Elong.=Elongation; Tear=Tear strength; Hard.=Hardness, Shore A.

EXAMPLE 2

Several organopolysiloxane compositions are prepared in which about 100 parts of polydimethylsiloxane (2000 cps.), about 65 parts of Minusil (5 microns), 10 parts of zinc oxide, and 5 parts of a curing agent are mixed and 3 parts of various catalysts are added to each of the resulting compositions. The compositions are poured into molds and allowed to cure at room temperature. The curing times of each of the various compositions are illustrated in Table II.

EXAMPLE 4

Several curable organopolysiloxane compositions are prepared by adding about 30 parts of Minusil (5 microns), 25 parts of zinc oxide and 0.5 parts of a catalyst to 100 parts of polydimethylsiloxane (2000 cps.). Each composition is mixed with varying amounts of a curing agent, poured into a mold and cured at room temperature for 7 days. The physical properties of the cured products are illustrated in Table IV.

TABLE IV

| Curing agents, parts | | Catalyst* | | | | Catalyst** | | | |
|---|---|---|---|---|---|---|---|---|---|
| GTMS | DΦDES | Ten., p.s.i. | Elong., percent | Tear, p.p.i. | Hard. | Ten., p.s.i. | Elong., percent | Tear, p.p.i. | Hard |
| 3.0 | | 564 | 209 | 36 | 43 | 554 | 178 | 40 | 40 |
| 2.0 | 1.00 | 386 | 290 | | 20 | 622 | 252 | 46 | 20 |
| 2.5 | 0.25 | 499 | 157 | 47 | 27 | 565 | 144 | 39 | 43 |
| 2.5 | 0.50 | 618 | 152 | 47 | 45 | 549 | 139 | 46 | 47 |
| 2.5 | 0.75 | 665 | 166 | 45 | 45 | 632 | 169 | 40 | 40 |

*Dibutyltin dilaurate.
**Bis(dimethyltin laurato) oxide.
NOTE.—GTMS=γ-Glycidoxypropyltrimethoxysilane; DΦDES=Diphenyldiethoxysilane: Ten.=Tensile strength; Elong.=Elongation; Tear=Tear strength; Hard.=Hardness, Shore A.

EXAMPLE 5

Several curable organopolysiloxane compositions are prepared by mixing 30 parts of Minusil (5 microns), 65 parts of iron oxide and 0.5 parts of dibutyltin butoxychloride with 100 parts of polydimethylsiloxane (2000 cps.). Each composition is mixed with varying amounts of a curing agent consisting of a mixture of 3,4-(epoxycyclohexyl)ethyltrimethoxysilane and diphenyldiethoxysilane or phenyltriethoxysilane, poured into a mold and cured for 7 days at room temperature. The physical properties of the various compositions are determined after 48 hours and again after 7 days. These test results are illustrated in Table V.

TABLE V

| Curing agents, parts | | Physical properties after— | | | | | | | |
|---|---|---|---|---|---|---|---|---|---|
| | | 48 hours | | | | 7 days | | | |
| β-3,4 | DΦDES | Ten., p.s.i. | Elong., percent | Tear, p.p.i. | Hard. | Ten., p.s.i. | Elong., percent | Tear, p.p.i. | Hard |
| 4.0 | 1.0 | 481 | 168 | 42 | 42 | 519 | 165 | 34 | 42 |
| 2.5 | 2.5 | 543 | 243 | 37 | 37 | 532 | 223 | 37 | 38 |
| | ΦTES | | | | | | | | |
| 4.0 | 1.0 | 496 | 160 | 44 | 44 | 516 | 148 | 36 | 45 |
| 2.5 | 2.5 | 625 | 170 | 46 | 46 | 552 | 149 | 33 | 47 |
| 1.0 | 4.0 | 662 | 174 | 48 | 48 | 675 | 187 | 34 | 48 |

NOTE.—β-3,4=β-3,4-(epoxycyclohexyl)ethyltrimethoxysilane; DΦDES=Diphenyldiethoxysilane; ΦTES=Phenyltriethoxysilane; Ten.=Tensile strength; Elong.=Elongation; Tear=Tear strength; Hard.=Hardness, Shore A.

EXAMPLE 6

A modified organopolysiloxane composition is prepared by adding about 125 parts of styrene, about 102 parts of butyl acrylate, about 152 parts of a hydroxyl-terminated polydimethylsiloxane (610 cps.), and about 1.1 parts of di-t-butylperoxide to a 1-liter flask. The mixture is heated to about 125° C. for about 24 hours. The residual monomers are removed at about 125° C. under reduced pressure yielding a white opaque liquid having a viscosity of about 14,500 cps.

Several curable compositions are prepared by mixing about 100 parts of the hydroxyl-terminated polydimethylsiloxane prepared above with about 0.5 parts of bis(dimethyl lauratotin) oxide. Each composition is mixed with varying amounts of γ - glycidoxypropyltrimethoxysilane, cast into test sheets and cured at room temperature for 7 days. The physical properties of the cured test sheets are illustrated in Table VI.

TABLE VI

| | γ-Glycidoxypropyltrimethoxysilane | | | |
|---|---|---|---|---|
| | 5 Parts | | 7 parts | |
| | 24 hours | 7 days | 24 hours | 7 days |
| Physical properties: | | | | |
| Tensile strength | 1,011 | 1,072 | 1,064 | 1,119 |
| Elongation | 327 | 346 | 272 | 304 |
| Tear strength | 192 | 197 | 215 | 208 |
| Hardness, Shore A | 82 | 77 | 83 | 81 |

Although specific examples of the invention have been described herein, it is not intended to limit the invention solely thereto but to include all the variations and modifications falling within the spirit and scope of the appended claims.

The invention claimed is:

1. A room temperature curable composition which comprises an hydroxyl terminated organopolysiloxane represented by the formula:

$$HO-Q-H$$ 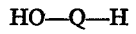

and a catalytic amount of a metallic salt of a carboxylic acid and a curing composition containing a silicon compound of the formula $$(Z-R')_n-G-(OR)_m$$ 

wherein Q represents a modified siloxane of the formula:

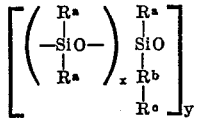

$R^a$ is selected from the group consisting of monovalent hydrocarbon radicals, halogenated monovalent hydrocarbon radicals and cyanoalkyl radicals; $R^b$ is a divalent hydrocarbon radical; $R^c$ is a polymeric organic group linked to $R^b$ by a carbon-to-carbon linkage, said polymeric group being constituted of recurring units derived from monomers containing ethylenic unsaturation, said monomers being selected from the class consisting of straight chain olefins whether or not attached to an aromatic nucleus, halogenated olefins again whether or not attached to an aromatic nucleus, unsaturated acids, esters of organic acids in which either the esterifying group or the derivative acids is unsaturated, unsaturated amides and unsaturated nitriles; G is selected from the class consisting of a silane and a siloxane containing from 2 to 10 silicon atoms and having organic groups selected from the class consisting of monovalent hydrocarbon radicals and cyanoalkyl radicals connected to the silicon atoms; R is selected from the group consisting of monovalent hydrocarbon radicals and halogenated monovalent hydrocarbon radicals; R' is a divalent radical having from 2 to 10 carbon atoms; Z is an oxirane; $m$ is a number of from 2 to 3, $n$ is a number of from 1 to 3 and when the groups (Z—R') and (OR) are connected to the same silicon atom the sum of $m$ and $n$ is equal to 4; $x$ is a number of from 1 to 20,000 and $y$ is a number of from 1 to 500.

2. A room temperature curable composition which comprises a hydroxyl terminated organopolysiloxane represented by the formula:

HO—Q—H and a catalytic amount of a metallic salt of a carboxylic acid and a silicon compound of the formula (Z—R')$_n$—G—(OR)$_m$ wherein Q represents a modified siloxane of the formula:

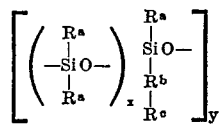

R$^a$ is selected from the group consisting of monovalent hydrocarbon radicals, halogenated monovalent hydrocarbon radicals and cyanoalkyl radicals; R$^b$ is a divalent hydrocarbon radical; R$^c$ is a polymeric organic group linked to R$^b$ by a carbon-to-carbon linkage, said polymeric group being constituted of recurring units derived from monomers containing ethylenic unsaturation, said monomers being selected from the class consisting of straight chain olefins whether or not attached to an aromatic nucleus, halogenated olefins again whether or not attached to an aromatic nucleus, unsaturated acids, esters of organic acids in which either the esterifying group or the derivative acid is unsaturated, unsaturated amides and unsaturated nitriles; G is selected from the class consisting of a silane and a siloxane containing from 2 to 10 silicon atoms and having organic groups selected from the class consisting of monovalent hydrocarbon radicals and cyanoalkyl radicals connected to the silicon atoms; R is selected from the group consisting of monovalent hydrocarbon radicals and halogenated monovalent hydrocarbon radicals; R' is a divalent radical having from 2 to 10 carbon atoms; Z is selected from the group consisting of a cyano radical, an acyloxy radical and an oxirane; $m$ is a number of from 2 to 3, $n$ is a number of from 1 to 3 and when the groups (Z—R') and (OR) are connected to the same silicon atom the sum of $m$ and $n$ is equal to 4; $x$ is a number of from 1 to 20,000 and $y$ is a number of from 1 to 500.

3. The composition of Claim 2 wherein (Z—R')$_n$—G—(OR)$_m$ represents beta-cyanoalkylenetrialkoxysilane.

4. The composition of Claim 2 wherein (Z—R')$_n$—G—(OR)$_m$ represents beta-acyloxyalkylenetrialkoxysilane.

5. The composition of Claim 2 wherein (Z—R')$_n$—G—(OR)$_m$ represents a glycidoxyalkylenetrialkoxysilane.

6. The composition of Claim 3 wherein the beta-cyanoalkylenetrialkoxysilane is beta - cyanoethyltriethoxysilane.

7. The composition of Claim 2 wherein (Z—R')$_n$—G—(OR)$_m$ represents beta - 3,4 - (epoxycyclohexyl)ethyltrialkoxysilane.

8. The curable composition of Claim 2 which contains a finely divided filler.

9. A method for preparing a room temperature curable composition which comprises mixing a hydroxyl-terminated organopolysiloxane represented by the general formula:

HO—Q—H with a mixture of cross-linking agents containing (1) a silicon compound of the formula:

(Z—R')$_n$—G—(OR)$_m$ and (2) from 20 to 80 percent by weight based on the weight of the mixture of cross-linking agents of a compound of the formula:

(RO)$_c$—G—(W)$_{4-c}$ and a catalytic amount of a metallic salt of a carboxylic acid; wherein Q represents a siloxane of the formula

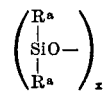

in which R$^a$ is selected from the group consisting of monovalent hydrocarbon radicals, halogenated monovalent hydrocarbon radicals and cyanoalkyl radicals; G is selected from the class consisting of a silane and a siloxane containing from 2 to 10 silicon atoms in which the silicon atoms are linked through Si—O—Si linkages and the remaining valences are satisfied by W or OR; R is selected from the group consisting of monovalent hydrocarbon radicals and halogenated monovalent hydrocarbon radicals; R' is a divalent radical having from 2 to 10 carbon atoms; W is selected from the group consisting of monovalent hydrocarbon radicals, halogenated monovalent hydrocarbon radicals, alkoxy and aryloxy radicals; Z is selected from the group consisting of a cyano radical, an acyloxy radical and an oxirane; $c$ is a number of from 2 to 4; $m$ is a number of from 2 to 3, $n$ is a number of from 1 to 3 and when the groups (Z—R') and (OR) are connected to the same silicon atom the sum of $n$ is equal to 4.

10. A curable organopolysiloxane composition comprising an organopolysiloxane having the formula

HO—Q—H a catalytic amount of a metallic salt of a carboxylic acid and a mixture of cross-linking agents having the formula (1) (Z—R')$_n$—G—(OR)$_m$ and (2) (RO)$_c$—G—(W)$_{4-c}$ wherein Q is a siloxane selected from the group consisting of

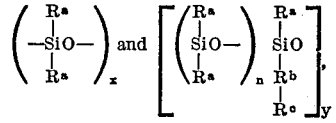

G is selected from the class consisting of a silicon atom and a siloxane in which the silicon atoms are linked through Si—O—Si linkages and the remaining valences are satisfied by W or OR; R is selected from the group consisting of monovalent hydrocarbon radicals and halogenated monovalent hydrocarbon radicals; R' is a divalent radical having from 2 to 10 carbon atoms; R" is selected from the group consisting of monovalent hydrocarbon radicals, halogenated monovalent hydrocarbon radicals and cyanoalkyl radicals; R$^a$ is selected from the group consisting of monovalent hydrocarbon radicals, halogenated monovalent hydrocarbon radicals and cyanoalkyl radicals; R$^b$ is a divalent hydrocarbon radical; R$^c$ is a polymeric group linked to R$^b$ by a carbon-to-carbon linkage, said polymeric group being constituted of recurring units derived from monomers containing ethylenic unsaturation, said monomers being selected from the class consisting of straight chain olefins whether or not attached to an aromatic nucleus, halogenated olefins again whether or not attached to an aromatic nucleus, unsaturated acids, esters of organic acids in which either the esterifying group or the derivative acid is unsaturated, unsaturated amides and unsaturated nitriles; Z is selected from the group consisting of a cyano radical, an acyloxy radical and an oxirane; W is selected from the class consisting of monovalent hydrocarbon radicals, halogenated monovalent hydrocarbon radicals, alkoxy radicals and aryloxy radicals; $c$ is a number of from 2 to 4; $m$ is a number of from 2 to 3, $n$ is a number of from 1 to 3 and when the groups (Z—R′) and (OR) are connected to the same silicon atom the sum of $m$ and $n$ is equal to 4; $x$ is a number of from 1 to 20,000, and $y$ is a number of from 1 to 500.

11. The composition of Claim 10 wherein the mixture of cross-linking agents contains from 20 to 80 percent by weight based on the weight of cross-linking agents of a compound of the formula $$(RO)_c\text{—}G\text{—}(W)_{4-c}$$

wherein G is selected from the class consisting of a silicon atom and a siloxane in which the silicon atoms are linked through Si—O—Si linkages and the remaining valences are satisfied by W or OR; R is selected from the group consisting of monovalent hydrocarbon radicals and halogenated monovalent hydrocarbon radicals; W is selected from the class consisting of monovalent hydrocarbon radicals, halogenated monovalent hydrocarbon radicals, alkoxy radicals and aryloxy radicals; and $c$ is a number of from 2 to 4.

12. The composition of Claim 10 wherein Z represents an oxirane.

13. The composition of Claim 10 wherein $$(Z\text{—}R')_n\text{—}G\text{—}(OR)_m$$

represents a glycidoxyalkylene trialkoxysilane.

14. The composition of Claim 10 wherein the cross-linking agent is a mixture of a glycidoxyalkylenetrialkoxysilane and a polyalkoxysiloxane.

15. The composition of Claim 10 wherein $$(Z\text{—}R')_n\text{—}G\text{—}(OR)_m$$

represents beta - 3,4 - (epoxycyclohexyl) ethyltrialkoxysilane.

16. The composition of Claim 10 wherein $$(Z\text{—}R')_n\text{—}G\text{—}(OR)_m$$

represents beta-acyloxyalkylenetrialkoxysilane.

17. The composition of Claim 10 wherein $$(Z\text{—}R')_n\text{—}G\text{—}(OR)_m$$

represents beta-cyanoalkylenetrialkoxysilane.

18. The composition of Claim 10 wherein R and W are alkyl groups and C is equal to 2.

19. A method for preparing a room temperature curable composition which comprises mixing a hydroxyl-terminated organopolysiloxane represented by the general formula:

$$HO\text{—}Q\text{—}H$$

with a mixture of cross-linking agents containing (1) a silicon compound of the formula:

$$(Z\text{—}R')_n\text{—}G\text{—}(OR)_m$$

and (2) from 20 to 80 percent by weight based on the weight of the mixture of cross-linking agents of a compound of the formula:

$$(RO)_c\text{—}G\text{—}(W)_{4-c}$$

and a catalytic amount of a metallic salt of a carboxylic acid; wherein Q represents a modified siloxane of the formula:

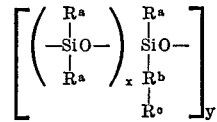

in which $R^a$ is selected from the group consisting of monovalent hydrocarbon radicals, halogenated monovalent hydrocarbon radicals and cyanoalkyl radicals; $R^b$ is a divalent hydrocarbon radical; $R^c$ is a polymeric organic group linked to $R^b$ by a carbon-to-carbon linkage, said polymeric group being constituted of recurring units derived from monomers containing ethylenic unsaturation, said monomers being selected from the class consisting of straight chain olefins whether or not attached to an aromatic nucleus, halogenated olefins again whether or not attached to an aromatic nucleus, unsaturated acids, esters of organic acids in which either the esterifying group or the derivative acid is unsaturated, unsaturated amides and unsaturated nitriles; G is selected from the class consisting of a silane and a siloxane containing from 2 to 10 silicon atoms in which the silicon atoms are linked through Si—O—Si linkages and the remaining valences are satisfied by W or OR; R is selected from the group consisting of monovalent hydrocarbon radicals and halogenated monovalent hydrocarbon radicals; R′ is a divalent radical having from 2 to 10 carbon atoms; W is selected from the class consisting of monovalent hydrocarbon radicals, halogenated monovalent hydrocarbon radicals, alkoxy radicals and acyloxy radicals; Z is selected from the group consisting of a cyano radical, an acyloxy radical and an oxirane; $c$ is a number of from 2 to 4; $m$ is a number of from 2 to 3, $n$ is a number of from 1 to 3 and when the groups (Z—R′) and (OR) are connected to the same silicon atom the sum of $m$ and $n$ is equal to 4; $x$ is a number of from 1 to 20,000 and $y$ is a number of from 1 to 500.

References Cited
UNITED STATES PATENTS

| | | | |
|---|---|---|---|
| 3,065,194 | 11/1962 | Nitzsche et al. | 260—37 |
| 3,161,614 | 12/1964 | Brown et al. | 260—46.5 |
| 3,240,731 | 3/1966 | Nitzsche et al. | 260—18 |
| 3,436,252 | 4/1969 | Neuroth | 117—155 |
| 3,485,780 | 12/1969 | Sterman et al. | 260—18 |
| 2,843,555 | 7/1958 | Berridge | 260—18 |
| 3,393,164 | 7/1968 | Braun | 260—18 |

OTHER REFERENCES

Modern Plastics, July 1963, pp. 125, 127, 129, 130, 134, 136, 138 and 177.

MELVYN I. MARQUIS, Primary Examiner

U.S. Cl. X.R.

260—18 S, 37 SB, 46.5 Y, 46.5 E, 46.5 G